United States Patent
Yang

(10) Patent No.: US 8,475,313 B2
(45) Date of Patent: *Jul. 2, 2013

(54) BICYCLE WITH OUTPUT IN CONSTANT ROTATING DIRECTION AND HAVING INTERNAL ROCKER ARM EPICYCLE WHEEL SET

(76) Inventor: Tai-Her Yang, Dzan-Hwa (TW)

( * ) Notice: Subject to any disclaimer, the term of this patent is extended or adjusted under 35 U.S.C. 154(b) by 172 days.

This patent is subject to a terminal disclaimer.

(21) Appl. No.: 13/028,276

(22) Filed: Feb. 16, 2011

(65) Prior Publication Data

US 2012/0208666 A1  Aug. 16, 2012

(51) Int. Cl.
*F16H 48/00* (2012.01)
(52) U.S. Cl.
USPC ............................................................ 475/12
(58) Field of Classification Search
None
See application file for complete search history.

(56) References Cited

U.S. PATENT DOCUMENTS

| | | | | |
|---|---|---|---|---|
| 8,272,988 B2* | 9/2012 | Yang | ............................... | 475/12 |
| 2011/0177902 A1* | 7/2011 | Yang | ............................... | 475/12 |
| 2011/0177907 A1* | 7/2011 | Yang | ............................... | 475/269 |
| 2011/0190085 A1* | 8/2011 | Yang | ............................... | 475/12 |
| 2011/0190087 A1* | 8/2011 | Yang | ............................... | 475/12 |
| 2011/0201468 A1* | 8/2011 | Yang | ............................... | 475/12 |
| 2011/0201469 A1* | 8/2011 | Yang | ............................... | 475/12 |
| 2012/0208665 A1* | 8/2012 | Yang | ............................... | 475/12 |
| 2012/0264558 A1* | 10/2012 | Yang | ............................... | 475/220 |

* cited by examiner

*Primary Examiner* — Dirk Wright
(74) *Attorney, Agent, or Firm* — Bacon & Thomas, PLLC

(57) ABSTRACT

The present invention is applied to pedal vehicles, or mixture of electric and pedal vehicles, or combination of electric and pedal auxiliary vehicles, especially to a bicycle capable of being pedaled bidirectionally and driven to move in unidirectional.

7 Claims, 2 Drawing Sheets

BICYCLE WITH OUTPUT IN CONSTANT ROTATING DIRECTION AND HAVING INTERNAL ROCKER ARM EPICYCLE WHEEL SET

BACKGROUND OF THE INVENTION (a) Field of the Invention

For the bicycle with output in constant rotating direction and having internal rocker arm epicycle wheel set of the present invention, human's foot drives the input terminal of the human input device at forward or reverse dual rotary direction, and then the output terminal of the human input device transmits the kinetic energy to the input terminal of the drive device with bidirectional input and one-way output, and the output terminal of the drive device with bidirectional input and one-way output produces constant rotary direction output to drive the load wheel set;

The drive device with bidirectional input and one-way output (13) of the bicycle with output in constant rotating direction and having internal rocker arm epicycle wheel set of the present invention is composed of an internal rocker arm type epicycle wheel system with bidirectional input and unidirectional output, in which the internal rocker arm type epicycle wheel system is combined with a one-way transmission, so that the inner rocker arm type epicycle wheel system is equipped with a transmission operational function of bidirectional output and unidirectional input. According to the internal rocker arm type epicycle wheel system with bidirectional input and unidirectional output of this invention, when an input shaft is driven in a first rotary direction and an input shaft is driven in a second rotary direction, the transmission relation between the input shaft having two driving status of different rotary directions and one-way rotation cylindrical output shaft can be formed as having the same or different transmission speed ratios;

The present invention is applied to pedal vehicles, or mixture of electric and pedal vehicles, or combination of electric and pedal auxiliary vehicles, especially to a bicycle capable of being pedaled bidirectionally and driven to move in unidirectional.

(b) Description of the Prior Art

The rider on the conventional bicycle always pedals at constant direction, and the related muscles and joints are constantly used during the pedaling period, i.e. some muscles and joints of the rider's body are constantly used and stressed, and the others are constantly unused and released, overall, the human load is uneven, the rider is easily fatigued, and exercise injury is caused by frequently pedaling.

SUMMARY OF THE INVENTION

The bicycle with output in constant rotating direction and having internal rocker arm epicycle wheel set of the present invention is equipped with a human input device with dual rotary direction input, in which the output terminal thereof connects to the input terminal of a drive device with bidirectional input and one-way output, and the constant rotary direction output is through the output terminal of the drive device with bidirectional input and one-way output to drive a load wheel set; the rider chooses the direction of driving input, and makes constant rotary direction output with same or different speed ratio at different driven input direction to drive the load wheel set.

The drive device with bidirectional input and one-way output (13) of the bicycle with output in constant rotating direction and having internal rocker arm epicycle wheel set of the present invention is composed of an internal rocker arm type epicycle wheel system with bidirectional input and unidirectional output, in which the internal rocker arm type epicycle wheel system is combined with a one-way transmission, so that the inner rocker arm type epicycle wheel system is equipped with a transmission operational function of bidirectional output and unidirectional input. According to the internal rocker arm type epicycle wheel system with bidirectional input and unidirectional output of this invention, when an input shaft is driven in a first rotary direction and another input shaft is driven in a second rotary direction, the transmission relation of the input shaft having two driving status of different rotary directions to one-way rotation cylindrical output shaft can be formed as having the same or different transmission speed ratios.

Figure 1:
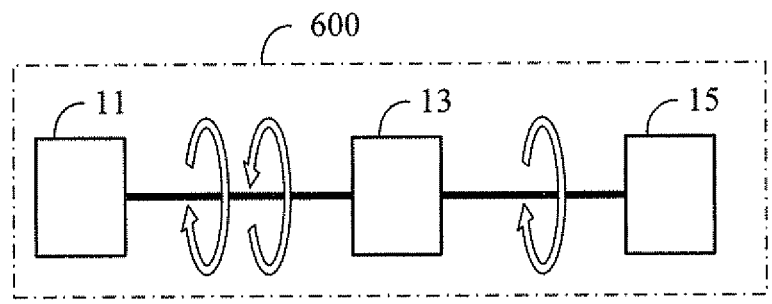
FIG. 1 is a schematic view showing the basic component blocks of the bicycle with output in constant rotating direction and having internal rocker arm epicycle wheel set, according to the present invention.

DESCRIPTION OF MAIN COMPONENT SYMBOLS (11): Human input device
(12): Front transmission
(13): Drive device with bidirectional input and one-way output
(14): Rear transmission
(15): Load wheel set
(101), (102), (103), (201): Bearing
(302), (303): One-way transmission
(400): Epicyclic gear support arm annular shelf
(401): Epicyclic gear shaft
(402): Inner bevel wheel
(403): Epicyclic gear
(404): Outer bevel wheel
(500): Shell
(600): Machine body
(2000): Input shaft
(3000): Cylindrical output shaft

DETAILED DESCRIPTION OF THE PREFERRED EMBODIMENTS

The bicycle with output in constant rotating direction and having internal rocker arm epicycle wheel set of the present invention drives the input terminal of the human input device at forward or reverse dual rotary direction through human's foot, and then the output terminal of the human input device transmits the kinetic energy to the input terminal of the drive device with bidirectional input and one-way output, and the output terminal of the drive device with bidirectional input and one-way output produces constant rotary direction output to drive the load wheel set, and further to drive the vehicle integrated with the load wheel set; the present invention is applied to pedal vehicles, or mixture of electric and pedal vehicles, or combination of electric and pedal auxiliary vehicles, especially to a bicycle capable of being pedaled bidirectionally and driven to move in unidirectional, for human's lower limbs pedaling at bi-direction to extend and change the muscle groups, thus achieving the following advantages:

(1) reducing the injured caused by some muscles and joints overused; and (2) employing or training the unused muscles and joints.

The present invention relates to a human input device with dual rotary direction input, in which the output terminal of the device is used to transmit the kinetic energy to the input terminal of the specific drive device with bidirectional input and one-way output, and the output terminal of the drive device with bidirectional input and one-way output produces constant rotary direction output to drive the load wheel set, and further to drive the vehicle integrated at the load wheel set; the rider selects the direction of pedal-driven input, and the drive device with bidirectional input and one-way output with same or different speed ratio produces constant rotary direction output at different driven input direction to drive the load wheel set;

The drive device with bidirectional input and one-way output (13) of the bicycle with output in constant rotating direction and having internal rocker arm epicycle wheel set of the present invention is composed of an internal rocker arm type epicycle wheel system with bidirectional input and unidirectional output, in which the internal rocker arm type epicycle wheel system is combined with a one-way transmission, so that the inner rocker arm type epicycle wheel system is equipped with a transmission operational function of bidirectional output and unidirectional input. According to the internal rocker arm type epicycle wheel system with bidirectional input and unidirectional output of this invention, when an input shaft is driven in a first rotary direction and an input shaft is driven in a second rotary direction, the transmission relation of the input shaft having two driving status of different rotary directions to one-way rotation cylindrical output shaft can be formed as having the same or different transmission speed ratios.

FIG. 1 is a schematic view showing the basic component blocks of the bicycle with output in constant rotating direction and having internal rocker arm epicycle wheel set, according to the present invention.

Figure 2:
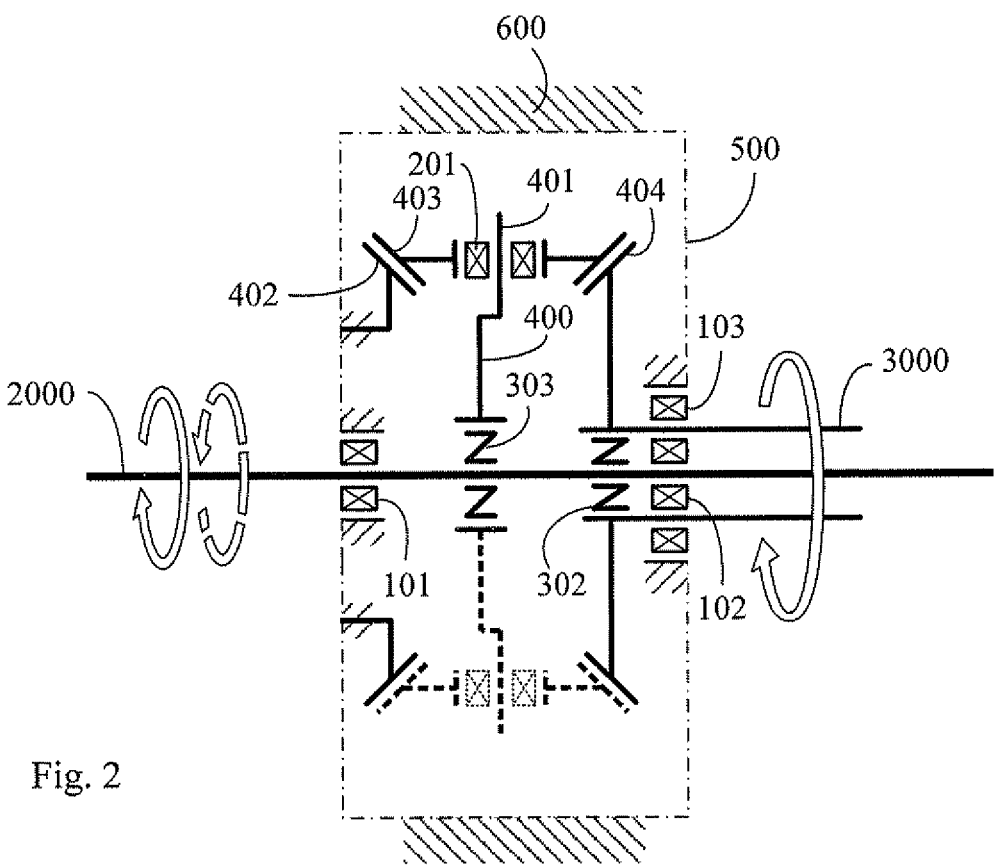
FIG. 2 is a schematic view showing the drive device with bidirectional input and one-way output (13) being composed of an internal rocker arm type epicycle wheel system, according to the present invention.

As shown in FIG. 1, which is a structural schematic view of the bicycle with output in constant rotating direction and having internal rocker arm epicycle wheel set, except for the components of the pedal vehicle and a machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

load wheel set (15): directly driven by the output terminal of the drive device with bidirectional input and one-way output (13), and thereby driving a vehicle integrated with the load wheel set (15);

drive device with bidirectional input and one-way output (13): which is driven by different rotary direction kinetic energy from the human input device (11), and outputs constant rotary direction kinetic energy, and composed of the internal rocker arm type epicycle wheel system with bidirectional input and unidirectional output as shown in FIG. 2;

FIG. 2 is a schematic view showing the drive device with bidirectional input and one-way output (13) being composed of an internal, rocker arm type epicycle wheel system, according to the present invention;

As shown in FIG. 2, the internal rocker arm type epicycle wheel system is combined with a one-way transmission and the input shaft and the output shaft are concentrically sleeved, and it mainly consists of:

Internal rocker arm type epicycle wheel set: constituted by an inner bevel wheel (402) and an outer bevel wheel (404) and at least an epicyclic gear (403), wherein bevel gears being mutually engaged to form a function of epicycle wheel set, or bevel friction wheels mutually incorporating to perform friction transmission to form the function of epicycle wheel set, and being provided with a shell (500) so as to be installed on a machine body (600), and also being provided with a rotation shaft and a bearing;

In the mentioned epicycle wheel set, the speed ratios of the inner bevel wheel (402) and the outer bevel wheel (404) are the same, and the speed ratios between the above two and the epicyclic gear (403) can be the same or different;

In the mentioned epicycle wheel set, the speed ratios of the inner bevel wheel (402) and the outer bevel wheel (404) are different, and the speed ratios between the epicyclic gear (403) and the outer bevel wheel (404) can be the same or different, and the speed ratios between the epicyclic gear (403) and the inner bevel wheel (402) can be the same or different;

one end of an input shaft (2000) is throughout installed at one side of the shell (500) of the transmission wheel system through a bearing (101), the other end of the input shaft (2000) penetrates the interior of a cylindrical output shaft (3000) through a one-way transmission (302) and a bearing (102); and another bearing (103) is installed between the cylindrical output shaft (3000) and the shell (500) of the transmission wheel system;

Shell (500) of the transmission wheel system: serving as a machinery member for structuring the internal rocker arm type epicycle wheel system with bidirectional input and unidirectional output, and the shell (500) is fastened to the machine body (600);

Machine body (600): serving as a relatively static machinery structural member;

Inner bevel wheel (402): fastened to the shell (500);

The epicyclic gear (403) is installed between the outer bevel wheel (404) and the inner bevel wheel (402); the center of the epicyclic gear (403) rotates on an epicyclic gear shaft (401) through a bearing (201); the epicyclic gear shaft (401) is combined with an epicyclic gear support arm annular shelf (400); a one-way transmission (303) is installed between the epicyclic gear support arm annular shelf (400) and the input shaft (2000);

The outer bevel wheel (404) is annularly installed on the cylindrical output shaft (3000).

The operational functions of the internal rocker arm type epicycle wheel system with bidirectional input and unidirectional output provided for composing the drive device with bidirectional input and one-way output (13) are as followings:

When the input shaft (2000) is driven in a first rotary direction through the human input device (11), the cylindrical output shaft (3000) performs the first rotary direction output through being driven by the one-way transmission (302) for structuring a first transmission wheel system; meanwhile, the input shaft (2000) is in an idle state through the one-way transmission (303) and the epicyclic gear support arm annular shelf (400);

When the input shaft (2000) is driven in a second rotary direction through the human input device (11), the epicyclic gear (403) and the outer bevel wheel (404) are driven through the one-way transmission (303) and the epicyclic gear support arm annular shelf (400) to drive the cylindrical output shaft (3000) to perform the same first rotary direction output for structuring a second transmission wheel system; meanwhile, the one-way transmission (302) installed between the input shaft (2000) and the cylindrical output shaft (3000) is in an idle state;

The operational functions are as followings:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to perform the first rotary direction input and produces the first rotary direction output; and an one-way transmission is installed between the second transmission wheel system and the first transmission wheel system to avoid the interference from the first transmission wheel system when the second transmission wheel system is used to be the second rotary direction input and produces the first rotary direction output.

According to the internal rocker arm type epicycle wheel system with bidirectional input and unidirectional output provided for composing the drive device with bidirectional input and one-way output (13), the bearings (101), (102), (103), (201) are composed of one of a rolling ball bearing, rolling post bearing, sleeve bearing, hydraulic bearing, magnetic levitation bearing or composed of a mixture of bearings.

According to the internal rocker arm type epicycle wheel system with bidirectional input and unidirectional output provided for composing the drive device with bidirectional input and one-way output (13), the epicyclic gear and support arm set structured by the epicyclic gear (403) and the bearing (201) and the epicyclic gear shaft (401) and the epicyclic gear support arm annular shelf (400) thereof can be one or more than one sets.

The embodiments disclosed in FIG. 1 and FIG. 2 can be further installed with a front transmission (12) and a rear transmission (14) for satisfying the application requirements.

Figure 3:
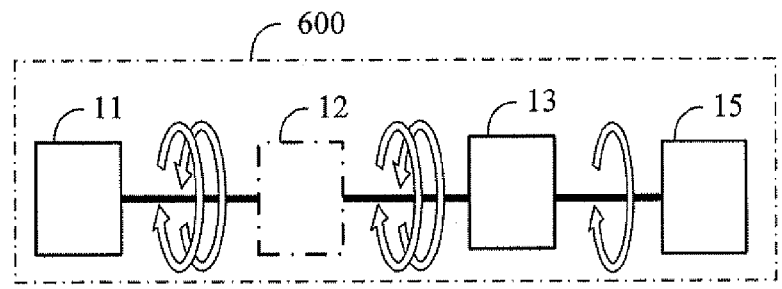
FIG. 3 is a schematic view showing the driving device component blocks, in which a front transmission (12) is additionally installed between a human input device (11) and a drive device with bidirectional input and one-way output (13) in FIG. 1.

FIG. 3 is a schematic view showing the driving device component blocks, in which a front transmission (12) is additionally installed between a human input device (11) and a drive device with bidirectional input and one-way output (13) in FIG. 1.

As shown in FIG. 3, which is a structural schematic view of the bicycle with output in constant rotating direction and having internal rocker arm epicycle wheel set, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

front transmission (12): constituted by one or more of the following transmissions including various rotary transmission functional structures, such as gear type, belt type, or friction-type, with constant speed ratio or variable speed ratio; in which the front transmission (12) is driven by the human input device (11) and outputs rotary kinetic energy for driving the drive device with bidirectional input and one-way output (13);

drive device with bidirectional input and one-way output (13): which is driven by different rotary direction kinetic energy from the front transmission (12), and outputs constant rotary direction kinetic energy; in which the transmission components within the drive device with bidirectional input and one-way output (13) are constituted by one or more of the followings, including (1) gear set; and/or (2) friction wheel set; and/or (3) chain and sprocket section; and/or (4) belt and pulley section; and/or (5) transmission crank and wheels set; and/or (6) fluid transmission unit; and/or (7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to perform the first rotary direction input and produces the first rotary direction output;

an one-way transmission is installed between the second transmission wheel system and the first transmission wheel system to avoid the interference from the first transmission wheel system when the second transmission wheel system is used to be the second rotary direction input and produces the first rotary direction output;

load wheel set (15): directly driven by the output terminal of the drive device with bidirectional input and one-way output (13), and thereby driving a vehicle integrated with the load wheel set (15).

Figure 4:
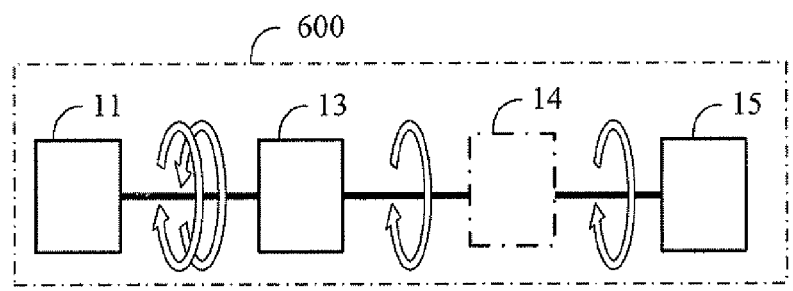
FIG. 4 is a schematic view showing the driving device component blocks, in which a rear transmission (14) is additionally installed between the drive device with bidirectional input and one-way output (13) and a load wheel set (15) in FIG. 1.

For the bicycle with output in constant rotating direction and having internal rocker arm epicycle wheel set of the present invention, the rotary kinetic energy output from the output terminal of the human input device (11), which is positively or reversely driven by human's foot, is transmitted to the drive device with bidirectional input and one-way output (13), and the output terminal of the drive device with bidirectional input and one-way output (13) outputs rotary kinetic energy with constant rotary direction to drive the load wheel set (15) through the additionally installed rear transmission (14), and to further drive a vehicle integrated with the load wheel set (15);

FIG. 4 is a schematic view showing the driving device component blocks, in which a rear transmission (14) is additionally installed between the drive device with bidirectional input and one-way output (13) and a load wheel set (15) in FIG. 1.

As shown in FIG. 4, which is a structural schematic view of the bicycle with output in constant rotating direction and having internal rocker arm epicycle wheel set, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

drive device with bidirectional input and one-way output (13): which is driven by different rotary direction kinetic energy from the human input device (11) through the front transmission (12), and outputs constant rotary direction kinetic energy; in which the transmission components within the drive device with bidirectional input and one-way output (13) are constituted by one or more of the followings, including 1) gear set; and/or 2) friction wheel set; and/or 3) chain and sprocket section; and/or 4) belt and pulley section; and/or 5) transmission crank and wheels set; and/or 6) fluid transmission unit; and/or 7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to be the first rotary direction input and produces the first rotary direction output;

an one-way transmission is installed between the second transmission wheel system and the first transmission wheel system to avoid the interference from the first transmission wheel system when the second transmission wheel system is used to be the second rotary direction input and produces the first rotary direction output;

rear transmission (14): constituted by one or more of the following transmissions including various rotary transmission functional structures, such as gear type, belt type, or friction-type, with constant speed ratio or variable speed ratio, for being driven by the drive device with bidirectional input and one-way output (13), whereas its output terminal is used to drive the load wheel set (15); and load wheel set (15): directly driven by the output terminal of the rear transmission (14), and thereby driving a vehicle integrated with the load wheel set (15).

Figure 5:
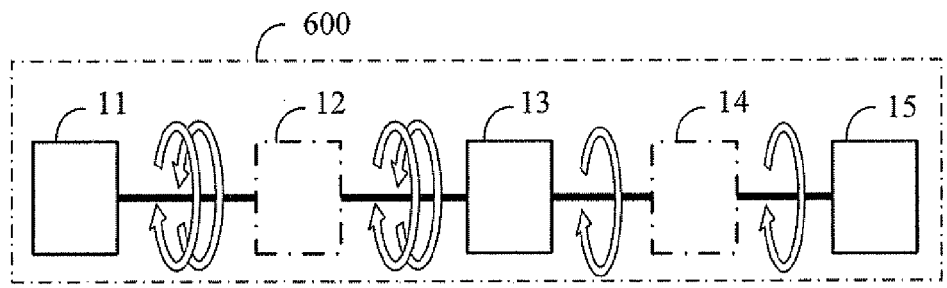
FIG. 5 is a schematic view showing the driving device component blocks, in which the front transmission (12) is additionally installed between the human input device (11) and the drive device with bidirectional input and one-way output (13), and the rear transmission (14) is additionally installed between the drive device with bidirectional input and one-way output (13) and the load wheel set (15) in FIG. 1.

For the bicycle with output in constant rotating direction and having internal rocker arm epicycle wheel set of the present invention, the human input device (11) is positively or reversely driven by human's foot, and outputs the rotary kinetic energy from the output terminal for transmitting to the input terminal of the drive device with bidirectional input and one-way output (13) through the additionally installed front transmission (12), and the output terminal of the drive device with bidirectional input and one-way output (13) outputs constant rotary direction output, and then through the additionally installed rear transmission (14) to drive the load wheel set (15), and to further drive a vehicle integrated with the load wheel set (15);

FIG. 5 is a schematic view showing the driving device component blocks, in which the front transmission (12) is additionally installed between the human input device (11) and the drive device with bidirectional input and one-way output (13), and the rear transmission (14) is additionally installed between the drive device with bidirectional input and one-way output (13) and the load wheel set (15) in FIG. 1.

As shown in FIG. 5, which is a structural schematic view of the bicycle with output in constant rotating direction and having internal rocker arm epicycle wheel set, except for the components of the pedal vehicle and the machine body (600), the main components include:

human input device (11): constituted by an output mechanism with dual rotary direction, which receives forward or reverse rotary driven input or reciprocating driven input from human's foot to produce forward or reverse rotation, including a pedal, a crank, and a driving wheel set with dual rotary direction, or a handle, a hand shank, and a driving wheel set with dual rotary direction, i.e. dual rotary direction mechanism by human power; in which the kinetic energy of the first driving rotary direction and the input kinetic energy of the second driving rotary direction are derived from human's foot for driving the input terminal of the human input device (11);

the first driving rotary direction and the second driving rotary direction are reverse;

front transmission (12): constituted by one or more of the following transmissions including various rotary transmission functional structures, such as gear type, belt type, or friction-type, with constant speed ratio or variable speed ratio; in which the front transmission (12) is driven by the human input device (11) and outputs rotary kinetic energy for driving the drive device with bidirectional input and one-way output (13);

drive device with bidirectional input and one-way output (13): which is driven by different rotary direction kinetic energy from the front transmission (12), and outputs constant rotary direction kinetic energy; in which the transmission components within the drive device with bidirectional input and one-way output (13) are constituted by one or more of the followings, including 1) gear set; and/or 2) friction wheel set; and/or 3) chain and sprocket section; and/or 4) belt and pulley section; and/or 5) transmission crank and wheels set; and/or 6) fluid transmission unit; and/or 7) electromagnetic force actuator; and when the drive device with bidirectional input and one-way output (13) is driven through being input the first driving rotary direction and the second driving rotary direction, which are different rotary directions, the speed ratio between the input terminal and the output terminal with constant rotary direction is the same, different, or variable; in which the main transmission structure and operational features of the drive device with bidirectional input and one-way output (13) are as following:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to be the first rotary direction input and produces the first rotary direction output;

an one-way transmission is installed between the second transmission wheel system and the first transmission wheel system to avoid the interference from the first transmission wheel system when the second transmission wheel system is used to be the second rotary direction input and produces the first rotary direction output;

rear transmission (14): constituted by one or more of the following transmissions including various rotary transmission functional structures, such as gear type, belt type, or friction-type, with constant speed ratio or variable speed ratio, for being driven by the drive device with bidirectional input and one-way output (13), whereas its output terminal is used to drive the load wheel set (15); and load wheel set (15): directly driven by the output terminal of the rear transmission (14), and thereby driving a vehicle integrated with the load wheel set (15).

For the bicycle with output in constant rotating direction and having internal rocker arm epicycle wheel set of the present invention, except for the related components, machine body and the load wheel set of the driven vehicle installed, it is also characterized in the function of the bidirectional input and one-way output, and the components and operational features of the drive device with bidirectional input and one-way output (13) are provided for describing the feasibility;

The installed drive device with bidirectional input and one-way output (13) in the bicycle with output in constant rotating direction and having internal rocker arm epicycle wheel set of the present invention, whose operational features are as following:

the first rotary direction and the second rotary direction are reverse;

if the input terminal is driven by the first rotary direction, the first rotary direction output is produced through the first transmission wheel system to drive the output terminal;

if the input terminal is driven by the second rotary direction, the first rotary direction output is produced through the second transmission wheel system to drive the output terminal;

an one-way transmission is installed between the first transmission wheel system and the second transmission wheel system to avoid the interference from the second transmission wheel system when the first transmission wheel system is used to be the first rotary direction input and produces the first rotary direction output;

an one-way transmission is installed between the second transmission wheel system and the first transmission wheel system to avoid the interference from the first transmission wheel system when the second transmission wheel system is used to be the second rotary direction input and produces the first rotary direction output.

The invention claimed is:

1. A bicycle having a bi-directional human input device (11) and an internal rocker arm epicycle gear set (500) with a constant direction output (13) for driving a load wheel set (15), wherein:

the human input device (11) includes a pedal, crank, and driving wheel set arranged to be selectively driven by forward, reverse, and reciprocating movements of a foot, or a handle, hand shank and driving wheel set arranged to be selectively driven by forward, reverse, and reciprocating movements of a hand, and to convert the forward, reverse, and reciprocating movements of the foot or hand into a bi-directional forward, reverse, and reciprocally rotating input to the epicycle gear set (500);

the load wheel set (15) is directly driven by the constant direction output (13) of the epicycle gear set (500) to propel the bicycle;

the epicycle gear set (500) is situated in a shell fastened to a machine body (600) of the bicycle and includes an inner bevel wheel (402) mounted to the shell, an annular outer bevel wheel (404) installed on a cylindrical output shaft (3000), and at least one epicyclic wheel (403) rotatably mounted on an epicyclic gear shaft (401) through an epicyclic gear shaft bearing (201), said epicyclic gear shaft (401) being combined with an epicyclic gear support arm annular shelf (400) of an internal rocker arm, the at least one epicyclic gear support arm annular shelf (400) being rotatably coupled with an input shaft (2000) through a first one-way transmission (303) and the at least one epicyclic wheel (403) being rotatably coupled with the inner bevel wheel (402) and the outer bevel wheel (404), wherein speed ratios between the inner bevel wheel (402), outer bevel wheel (404), and epicyclic wheel (403) have one of the following arrangements:

(i) the inner and outer bevel wheels (402,404) rotate at the same speed and the epicyclic wheel (403) rotates at a same or different speed that the inner and outer bevel wheels (402,404);

(ii) the inner and outer bevel wheels (402,404) rotate at different speeds, the inner bevel wheel (402) rotates at a same or different speed than the epicyclic wheel (403), and the outer bevel wheel (404) rotates at a same or different speed than the epicyclic wheel (403);

a first end of the input shaft (2000) receives the bi-directional forward, reverse, and reciprocating input from the human input device (11) and is installed at one side of the shell through a first bearing (101)j;

a second end of the input shaft (2000) extends into an interior of the cylindrical output shaft (3000), the second end of the input shaft (2000) being rotatably coupled with the cylindrical output shaft (3000) through a second one-way transmission (302) and a second bearing (102);

the cylindrical output shaft (3000) being rotatably mounted to the shell via a third bearing (103); and the epicyclic gear set (500) has the following input/output functions depending on whether the input from the human input device (11) drives the input shaft (2000) in a forward or reverse direction:

when the input shaft (2000) is driven in a forward direction, the cylindrical output shaft (3000) is driven to rotate in a constant output direction by the input shaft (2000) through the second one-way transmission (302) while the first one-way transmission (303) and epicyclic gear support arm annular shelf (400) are in an idle state; and when the input shaft (2000) is driven in a reverse direction, the cylindrical output shaft (3000) is driven to rotate in the constant output direction through the first one-way transmission (303), the epicyclic gear support arm annular shelf (400), the epicyclic wheel (403), and the outer bevel wheel (404) while the second one-way transmission (302) is in an idle state.

2. A bicycle having a bi-directional human input device (11) and an internal rocker arm epicycle gear set (500) with a constant direction output (13) for driving a load wheel set (15) as claimed in claim 1, wherein the inner bevel wheel (402), the epicyclic wheel (403), and the outer bevel wheel (404) are respective bevel gears or bevel friction wheels.

3. A bicycle having a bi-directional human input device (11) and an internal rocker arm epicycle gear set (500) with a constant direction output (13) for driving a load wheel set (15) as claimed in claim 1, wherein a front transmission (12) including at least one of a gear set, friction wheel set, chain and sprocket, belt and pulley, transmission crank and wheels, fluid transmission unit, and electromagnetic force actuator, is installed between the human input device (11) and epicyclic gear set (500).

4. A bicycle having a bi-directional human input device (11) and an internal rocker arm epicycle gear set (500) with a constant direction output (13) for driving a load wheel set (15) as claimed in claim 3, wherein a rear transmission (14) including at least one of a gear set, friction wheel set, chain and sprocket, belt and pulley, transmission crank and wheels, fluid transmission unit, and electromagnetic force actuator, is installed between the constant direction output (13) of the epicyclic gear set (500) and the load wheel set (15).

5. A bicycle having a bi-directional human input device (11) and an internal rocker arm epicycle gear set (500) with a constant direction output (13) for driving a load wheel set (15) as claimed in claim 1, wherein a rear transmission (14) including at least one of a gear set, friction wheel set, chain and sprocket, belt and pulley, transmission crank and wheels, fluid transmission unit, and electromagnetic force actuator, is installed between the constant direction output (13) of the epicyclic gear set (500) and the load wheel set (15).

6. A bicycle having a bi-directional human input device (11) and an internal rocker arm epicycle gear set (500) with a constant direction output (13) for driving a load wheel set (15) as claimed in claim 1, wherein the first, second, and third bearings (101,102,103) and the epicyclic gear shaft bearing (201) include at least one of a rolling ball bearing, a rolling post bearing, a sleeve bearing, a pneumatic bearing, a magnetic levitation bearing, and a mixture of bearings.

7. A bicycle having a bi-directional human input device (11) and an internal rocker arm epicycle gear set (500) with a constant direction output (13) for driving a load wheel set (15) as claimed in claim 1, further comprising at least one additional epicyclic gear shaft (401) combined with the epicyclic gear support arm annular shelf, and at least one additional epicyclic wheel (403) mounted to the at least one additional epicyclic gear shaft (401) through at least one additional epicyclic gear shaft bearing (201).

* * * * *